Figure 1:
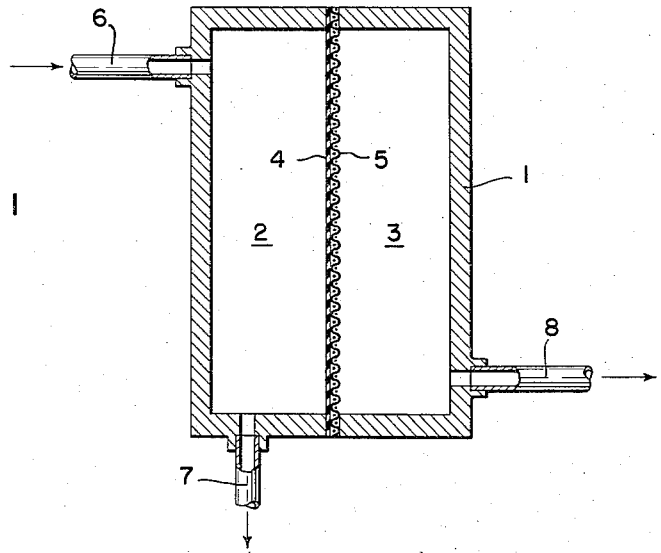

Dec. 27, 1960

K. KAMMERMEYER 2,966,235

SEPARATION OF GASES BY DIFFUSION
THROUGH SILICONE RUBBER
Filed Sept. 24, 1958

INVENTOR.
KARL KAMMERMEYER

BY *[signature]*

ATTORNEY.

United States Patent Office 2,966,235
Patented Dec. 27, 1960

2,966,235

SEPARATION OF GASES BY DIFFUSION THROUGH SILICONE RUBBER

Karl Kammermeyer, Iowa City, Iowa, assignor to Selas Corporation of America, a corporation of Pennsylvania Filed Sept. 24, 1958, Ser. No. 763,778

5 Claims. (Cl. 183—115)

This application is a continuation-in-part of my co-pending application Serial No. 672,511, filed July 17, 1957, entitled Separation of Gases, now abandoned.

The present invention relates to a process of separating gases, and more particularly to a method of separating carbon dioxide from a gas mixture containing carbon dioxide and other gases such as hydrogen, nitrogen, oxygen, and helium by permeation through a thin, non-porous membrane.

There are essentially two kinds of membranes which have been used for separation in the gaseous phase. They are plastic films and porous bodies. Porous bodies consisting of inert materials with micropores of the proper size will separate gases by virtue of their characteristic pore structure in accordance with Graham's law. This means that in a mixture of gases, the gas possessing the lower molecular weight will pass through the porous membrane faster than the gas or gases having the higher molecular weight. On the other hand, plastic films may give separation in the same direction as a porous body, or in the opposite direction. The factor of selectivity enters in the case of plastic films, and this factor is usually influenced greatly by the solubility relationships between the plastic membrane and the gases being separated by said membrane.

In this respect, then, plastic films possess the advantage of specific selectivity. This means that for a given separation a greater degree of separation may be obtained through a plastic film than can be obtained in a single pass with a microporous membrane. Unfortunately, however, plastic films or membranes are usually quite slow. This is a serious disadvantage, and, in spite of favorable selectivities most plastic membranes are too slow to warrant consideration for commercial separation operations.

It is an object of the invention to provide a plastic film or membrane for the separation of gases in commercial quantities. It is a further object of the invention to provide a method of separating carbon dioxide from a mixture of gases containing that gas by the use of a plastic film or membrane.

I have discovered that a thin, non-porous membrane of silicone rubber, or essentially any silicone polymer type composition, will permit a much greater rate of flow, of and has at least as high or higher selectivity for, carbon dioxide than other plastic or rubber membranes. The permeation of carbon dioxide through such membranes is much higher than that of the other gases on a relative basis.

Broadly, the process of the invention comprises the steps of bringing a mixture of gases containing carbon dioxide into contact with one side of a thin non-porous membrane of silicone rubber or other silicone polymer, causing a portion of the mixture to permeate through the membrane, and removing a carbon dioxide enriched mixture from the other side of the membrane.

In order to obtain separation or enrichment of the mixture with a particular gas therein, it is essential that not all of the mixture be permitted to pass through the membrane. The degree of enrichment will decrease as a larger proportion of the mixture permeates the membrane. In general, the selectivity of a membrane is independent of its thickness. The amount of gas that can permeate through a membrane of a given area in a given time, however, is dependent upon its thickness. Also the amount of gas that can permeate within a given time will depend upon the pressure drop across the membrane. It will be seen therefore, that it is desirable to use the thinnest membrane that will withstand the pressure drop across it.

Figure 2:
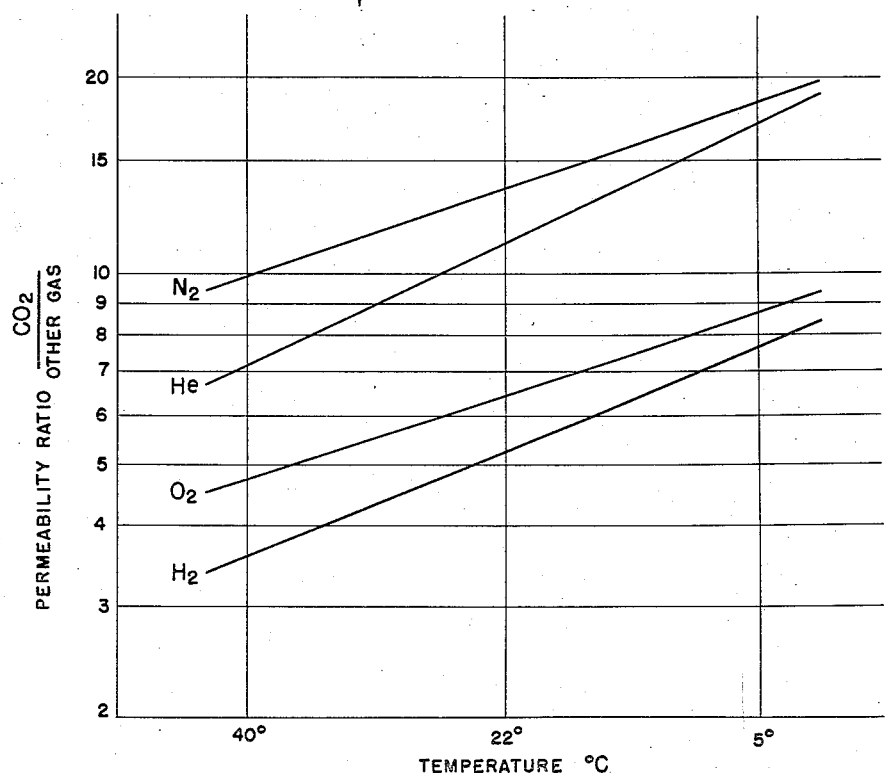

In the drawings:

Fig. 1 shows diagrammatically one form of apparatus that can be used in performing the method, and Fig. 2 is a series of curves showing the relative permeability of $CO_2$ and other gases through a silicone rubber membrane.

There is disclosed in Fig. 1, structure 1 forming a chamber that is divided into two compartments 2 and 3 by a separation membrane 4. This membrane is made of a non-porous sheet of silicone rubber or other silicone polymer. Since it is desirable to have the membrane as thin as possible, the down-stream side of the membrane is backed up by some means such as a wire screen 5. The mixture to be separated is supplied to compartment 2 under a suitable pressure through a conduit 6, and that part of the mixture that does not pass through the membrane is withdrawn through conduit 7. The enriched mixture is withdrawn from compartment 3 through conduit 8.

If desired, a plurality of these separating chambers can be used in series with the outlet 8 of one supplying the inlet 6 of the next in the series. When a plurality of chambers is used some means is required to raise the pressure of the gas to a suitable value after it leaves one chamber and before being introduced to the down-stream chamber.

The membranes that are used can either be completely unsupported, and depend entirely upon screen 5 for their support, or they can consist of a fabric such as glass fabric that has been coated with a thin layer of silicone rubber. Ordinarily the membranes will be from 4 to 15 mils in thickness, with the thinnest membrane capable of withstanding the differential pressure across it being used. The pressure in the up-stream compartment 2 will be appreciably higher than that in the downstream compartment 3. The up-stream pressure can desirably be kept between 40 and 75 p.s.i., while the down-stream pressure is atmospheric or below atmospheric. The rate at which the gas mixture flows through compartment 2 will depend upon the amount or degree of separation that is to be obtained through a given membrane.

The term "silicone rubber" as used herein refers to the homopolymeric dialkylsiloxanes and copolymers of dialkylsiloxane and siloxanes of the type $RR'SiO$ where $R$ is a monocyclic aryl radical and $R'$ is alkyl or monocyclic aryl. The alkyl group is preferably methyl. Among the most common silicone rubbers are the polymers chemically defined as dimethyl polysiloxane having the formula $[(CH_3)_2SiO]_n$ where $n$ is an integer above 500 and wherein the polymer has the characteristics of curing into a solid, rubber-like material having an average molecular weight of as high as 500,000 or more.

Silicone rubber in accordance with this invention is conventionally manufactured by condensation of dimethylsilanediol:

$(CH_3)_2Si(OH)_2 \xrightarrow{-H_2O}$

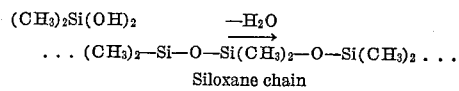

... $(CH_3)_2-Si-O-Si(CH_3)_2-O-Si(CH_3)_2$ ...
Siloxane chain

Conventionally, the elastomer is then milled with an organic filler on mixing rolls, just as is done with natural or synthetic rubber. A curing catalyst is added during the mixing, and then the plastic mass is molded to the desired shape and is cured to an insoluble infusible elastic material. It is preferably formed into a thin sheet or membrane having a thickness of about 4–15 mils.

EXAMPLE 1

A typical silicone rubber which was found highly effective in accordance with this invention was compounded as follows:

| | Parts by wt. |
|---|---|
| Dimethyl polysiloxane (average molecular weight 500,000) | 100 |
| Silica aerogel (filler) | 35 |
| Benzoyl peroxide | 1.5 |

The above materials were mixed on a rubber mill, then sheeted to form a film and the film cured for 1 hour at 300° F. in a circulating air oven.

EXAMPLE 2

Another typical silicone rubber in accordance with this invention was as follows:

| | Parts by wt. |
|---|---|
| Dimethyl polysiloxane polymer (average molecular weight 200,000) | 100 |
| Synthetic silica (fine) filler | 30 |
| Diatomaceous earth | 15 |
| Barium zirconate | 5 |
| Zinc oxide | 1 |

This material was compounded into a thin sheet as in the previous example and cured at 300° F. in a circulating air oven.

This compounded cured elastomer or rubber shares with all the other methylsilicone products the common characteristic of exceptional thermal stability. The material does not melt when heated in air at 300° C., which is far above the decomposition temperature of natural rubber. Service over long periods of time at 150° C. does not destroy its elasticity. The properties of silicone rubber change slowly with temperature. The elasticity persists down to −55° C.

Silicone rubber also has excellent electrical properties. A molded sample with silica filler had a dielectric constant of 3.0 at room temperature over a range of 60 to $10^{10}$ cycles. The loss factor remains at 0.004 from 60 to $10^7$ cycles and then rises rapidly to 0.037 at $10^9$ cycles and 0.055 at $10^{10}$ cycles. At 102° C. the values remain the same except for a small decrease in dielectric constant and a slight indication of enhanced D.C. conductivity. Silicone rubber is not affected by ozone.

EXAMPLE 3

A polymerized dimethyl silicone, in the form of a gum having the consistency of a stiff jelly, is mixed with a pigment in the form of a finely divided aluminum oxide. Other suitable finely divided minerals or precipitates such as silicon oxide or titanium oxide, as well as porous silica aerogel, carbon black, whiting, diatomaceous earth, zinc oxide and the like, may be substituted. Prior to the addition of any curing agent, the mixture of gum and pigment is heated in order to remove low-volatile materials. Then a curing agent, for example benzoyl peroxide, is introduced into the mix, the mix is milled, and then heated in order to effect a final cure.

The resulting material, preferably having the form of a thin sheet or membrane having a thickness of about 15 mils, exhibited very high rates of permeation for hydrogen, oxygen and nitrogen. The selectivity of carbon dioxide permeation in relation to other gases such as hydrogen, oxygen and nitrogen was very high. The highest value of carbon dioxide permeability obtained on the unsupported films was:

$$\frac{315 \times 10^{-9} \text{ (std. cc.) (cm. thickness)}}{\text{(sec.) (sq. cm. area) (cm. Hg press. drop)}}$$

EXAMPLE 4

A film as manufactured in accordance with Example 3 was tested for permeability ratio at varying temperatures, separate tests being conducted for four different gases each admixed with carbon dioxide. The results of such tests appear graphically on Fig. 2 of the drawings, values for the permeability ratio being as reported above in Example 3.

EXAMPLE 5

As reported in the patent to Warrick, No. 2,460,795, the rubbery organo-siloxanes may be prepared by hydrolyzing a hydrolyzable diorganosilane followed by condensation of the hydrolysis product. In the alternative, the rubbery organopolysiloxanes may be prepared from mixtures of different hydrolyzable organo-monosilanes containing at least 40 percent of hydrolyzable di-alkylsilane. The product may be made from wide varieties of hydrolyzable organo-silanes, which are derivatives of $SiH_4$ and which have the general formula $R_ySiX_{(4-y)}$, where R represents an organic radical attached to the silicon through carbon-silicon linkages, X represents a readily hydrolyzable radical selected from the class consisting of halogens, amino groups, alkoxy, aroxy and acyloxy radicals, and $y$ is an integer from 1 to 3. Many such suitable starting materials, as well as specific methods for their use, are disclosed in the aforementioned patent to Warrick, the disclosure of which is incorporated herein by reference.

Various means, well known in the art, may be utilized for converting the low molecular weight silicone starting material to the final rubber membrane product. The polymerization may be carried out in one or more stages. As is disclosed by the patent to Marsden et al. No. 2,469,883, dimethyl polysiloxane gums may be prepared by shaking the low molecular weight methyl polysiloxane oil with concentrated sulphuric acid or chlorosulphonic acid, maintaining the conditions in a manner to produce a polysiloxane gum. The resulting polymer is thoroughly washed in order to remove residual acid. The silicone gum may then be mixed with fillers, etc. such as lead oxide and titanium dioxide, and then mixed with benzoyl peroxide or the equivalent. After the necessary milling, the elastomer stock may be pressed and vulcanized in the usual manner, resulting in a silicone elastomer.

In accordance with this invention, the silicone rubbers also include copolymers such as those reported, for example, in the patent to Warrick No. 2,560,498. Such copolymers are produced from mixtures of dimethyl siloxanes and, for example, phenyl ethyl, phenyl methyl, or tolyl methyl siloxane. The copolymer is compounded with from 2–10% by weight of the usual di-organo peroxide, and if desired a filler, and vulcanized by heating it at a temperature above about 110° C. for at least three minutes.

It will be appreciated that wide varieties of compounding and vulcanizing methods may be employed, as is the case with other forms of rubbers, and that many different vulcanizing agents have been found suitable. For example, the patent to Warrick No. 2,572,227 discloses vulcanization with benzoyl peroxide or tertiary butyl perbenzoate.

The particular organo polysiloxanes used as starting materials in preparing silicone rubbers in the practice of this invention are not critical. In addition to the dimethyl silane diol which is conventionally used, dimethyl dichlorosilane, mixtures of dimethyl dichlorosilane and diphenyl dichlorosilane, mixtures of dimethyl dichlorosilane and methylphenyl dichlorosilane, etc., may be used. Such materials may be used with or without the presence of small amounts of mono-organo hydrolyzable silanes or tri-organo hydrolyzable silanes such as methyl trichlorosilane or trimethyl chlorosilane, etc. The polymerization of the hydrolysis product may be carried out using, for example, an alkyline agent such as potassium hydroxide, or an acidic agent such as ferric chloride.

The permeability data for silicone rubber in accordance with this invention differs sharply from data for other barriers, as shown in the following table.

Table I

PERMEABILITY DATA OF PLASTIC FILM MATERIALS $P \times 10^9$ for given gas (room temperature)

Permeability in: $\dfrac{(\text{std. cc.})(\text{cm.})^1}{(\text{sec.})(\text{sq. cm.})(\text{cm. Hg}\Delta p)}$

| Film Type | $H_2$ | $N_2$ | $O_2$ | $CO_2$ |
|---|---|---|---|---|
| 1.1. Silicone rubber—dimethyl polysiloxane, see Example 2 above | 65 | | | 270 |
| 2. Silicone rubber (dimethyl polysiloxane) coated fabric— see Example 3 above | 25 | 10 | 21 | 130 |
| | | 16 | 48 | ~200 |
| 3. Silicone rubber (dimethyl polysiloxane—see Example 2 above | | | 26 | 104 |
| 4. Cellulose acetate | 0.8–1.5 | | | 0.7–2.1 |
| 5. Cellulose acetate | 0.7–0.9 | | | 0.6–0.8 |
| 6. Cellulose acetate | 0.8–1.1 | | | 0.9–1.4 |
| 7. Polyethylene | 0.86 | 0.12 | 0.35 | 1.40 |
| 8. Polyethylene | 1.90 | | | 1.20 |
| 9. Ethylcellulose | 3.20 | 0.84 | 2.65 | 4.40 |
| 10. Polystyrene | 9.10 | 0.78 | 2.40 | 3.70 |
| 11. "Pliofilm" (rubber hydrochloride) | 0.16–0.23 | | | 0.06–9.15 |
| 12. Copolymer of polyvinyl chloride and polyvinyl acetate | 1.0 | 0.007 | 0.3 | 1.7 |
| 13. Natural rubber | | 0.81 | 2.3 | 12.1 |
| 14. Polybutadiene | | 0.645 | 1.9 | 13.8 |

The ratio of permeability values, based on the tests reported in Table I, shows sharp selectivity for $CO_2$, as indicated in the following table.

Table II

RATIO OF PERMEABILITY VALUES

| Membrane Material | P $CO_2$/P $H_2$ | P $CO_2$/P $O_2$ | $CO_2$ Flow Rate | P $O_2$/P $N_2$ | $O_2$ Flow Rate |
|---|---|---|---|---|---|
| Dimethyl polysiloxane elastic membrane, see Example 1 above | 4.15 | | 100 | | |
| Dimethyl polysiloxane rubber coated fabric, see Example 3 above | 5.2 | 6.2 | 48 | 2.1 | 100 |
| | | 4.2 | 74 | 3.0 | 228 |
| Dimethyl polysiloxane rubber, see Example 2 above | | 4.0 | 39 | | 124 |
| Cellulose acetate | 1.0–1.5 | | 0.4 | 1.8 | |
| Polyethylene | 1.63 | 4.0 | 0.5 | 2.95, 2.5–2.7 | 1.7 |
| Ethylcellulose | 1.37 | 1.65 | 1.6 | 3.15, 2.4–3.3 | 12.6 |
| Polystyrene | 0.4 | 1.54 | 1.4 | 3.1, 3.0 | 11.5 |
| Polyvinyl chloride, polyvinyl acetate | 1.7 | 5.6 | 0.6 | 4.3, 1.5 | 1.4 |
| Natural rubber | | 5.7 | 4.9 | 2.8, 2.1–2.6 | 11.0 |
| Polybutadiene | | 7.2 | 5.1 | 2.96 | 9.1 |

The following table illustrates the separation of carbon dioxide from an oxygen mixture, using molded silicone rubber sheets of the type disclosed in Example 1, at room temperature, using a feed containing 53.2% $CO_2$ and 48.6% $O_2$.

Table III

SEPARATION OF CARBON DIOXIDE— OXYGEN MIXTURE

| Fraction of Gas Mixture Passing through Membrane, percent of Feed | Percent $CO_2$ in Enriched Fraction (Fraction Premeated through Membrane) | Percent Enrichment over Feed Mixture |
|---|---|---|
| 35.0 | 74.3 | 21.1 |
| 63.1 | 66.1 | 12.9 |
| 66.9 | 66.0 | 12.8 |
| 82.7 | 58.4 | 5.2 |

EXAMPLE 6

A silicone rubber membrane 0.0075 of an inch thick, of the type referred to in Example 2, was used to separate a mixture of 53.2% carbon dioxide and 46.8% oxygen, with a pressure drop of 50 p.s.i. across the membrane with the following results:

| Fraction of gas mixture passing through membrane, percent | Percent $CO_2$ in enriched fraction | Percent Enrichment over feed mixture |
|---|---|---|
| 37.5 | 74.2 | 21.0 |
| 61.8 | 63.5 | 10.3 |
| 76.1 | 60.4 | 7.2 |
| 80.7 | 59.1 | 5.9 |

The values for concentration changes when plotted against "fraction permeated" give a rather straight line.

The above results shown an excellent separation for a single step. The percent carbon dioxide in the enriched fraction of the mixture can be increased appreciably, if desired, by passing the enriched fraction through a second membrane. This will depend upon the degree of purity desired of the separated gas.

Referring to Fig. 2 of the drawings, it will be seen that silicone rubber has a preferential selectivity for carbon dioxide over oxygen, for example, of between 6 and 7 to 1 at room temperatures and it also has a high permeability rate for these gases. Fig. 2 also shows the selectivity with this membrane of carbon dioxide over helium is as much as 11 to 1 at room temperatures, and the permeability rates are high. The various curves show that the ratio of permeability of carbon dioxide to the other gas increases materially as the temperature of operation decreases. This is unusual as with most other membranes the permeability ratio remains essentially constant with temperature changes. This is believed to come about because the carbon dioxide permeability changes very little with temperature while the permeabilities of the other gases decrease with decreasing temperature, as is usually the case. The solubility of the gases in the membrane appears to play an important part in its selectivity, and the solubility of $CO_2$ is equally applicable to all the types of silicon rubbers referred to herein.

As the gases and vapors permeate the membranes at their respective rates, independent of each other, the enrichment of such gases can be determined from the permeability values of the components. There is no general correlation between the type of membrane and its selectivity or its permeability.

Although the gases specifically reported herein all have molecular weights below that of $CO_2$, the advantages of this invention apply to the separation of $CO_2$ from a wide variety of gases—in fact, from all gases known to me. The separation appears to result from a difference of solubility relative to the polysiloxane membrane. Any difference of solubility results in a difference of permeability, permitting separation of components as herein disclosed.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

Having thus described my invention, I claim:

1. In a method of separating carbon dioxide from a gas mixture consisting of carbon dioxide and at least one elemental gas inert with respect to carbon dioxide, the steps which comprise bringing the mixture into contact with one side of a thin, non-porous membrane consisting essentially of a diorgano polysiloxane rubber, wherein at least a substantial part of said diorgano polysiloxane rubber is a polysiloxane having the formula $$[(CH_3)_2SiO]_n$$

where $n$ is an integer above 500, causing a portion of the mixture to permeate through said membrane, and removing carbon dioxide enriched mixture from the opposite side of said membrane.

2. The method of claim 1 in which said elemental gas is oxygen.

3. The method of claim 1 in which said elemental gas is helium.

4. The method of claim 1 in which said elemental gas is nitrogen.

5. The method of claim 1 in which said elemental gas is hydrogen.

References Cited in the file of this patent

UNITED STATES PATENTS 2,862,575    Birdwhistell et al. _____ Dec. 2, 1958

OTHER REFERENCES

"The Diffusibility of Anesthetic Gases Through Rubber" by A. J. Wineland et al.; Anethesia and Analgesia, September-October 1929, pages 322 and 323.